(12) United States Patent
Seki et al.

(10) Patent No.: US 6,328,526 B1
(45) Date of Patent: Dec. 11, 2001

(54) GAS TURBINE STARTING METHOD

(75) Inventors: Naoyuki Seki; Hisato Arimura, both of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/531,148

(22) Filed: Mar. 17, 2000

(30) Foreign Application Priority Data

Apr. 2, 1999  (JP) ................................................. 11-096372

(51) Int. Cl.$^7$ ...................................................... F01D 17/00
(52) U.S. Cl. ................................ 415/1; 415/27; 415/149.4
(58) Field of Search .................................... 415/1, 23, 27, 415/28, 29, 33, 36, 37, 39, 46, 149.1, 149.2, 149.4, 160, 162

(56) References Cited

U.S. PATENT DOCUMENTS

| | | | |
|---|---|---|---|
| 2,305,311 | * 12/1942 | Jendrassik | 415/149.1 X |
| 3,240,422 | * 3/1966 | Pettersen et al. | 415/1 |
| 3,677,000 | * 7/1972 | Thomson | 415/1 X |
| 3,979,903 | * 9/1976 | Hull, Jr. et al. | 415/145 X |
| 3,996,964 | * 12/1976 | McCombs | 415/28 X |
| 4,428,194 | * 1/1984 | Stokes et al. | 415/27 X |
| 5,042,245 | * 8/1991 | Zickwolf, Jr. | 60/39.03 |
| 5,281,087 | * 1/1994 | Hines | 415/160 |
| 5,375,412 | * 12/1994 | Khalid et al. | 415/27 X |
| 5,586,857 | * 12/1996 | Ishii et al. | 415/23 |
| 6,059,522 | * 5/2000 | Gertz et al. | 415/1 |
| 6,164,902 | * 12/2000 | Irwin et al. | 417/17 |

* cited by examiner

Primary Examiner—John E. Ryznic
(74) Attorney, Agent, or Firm—Wenderoth, Lind, & Ponack, L.L.P.

(57) ABSTRACT

Gas turbine starting method is improved to start operation with bleed valves being first throttled, then fully opened on the way and then fully closed at 90% speed, thereby fluid unstableness phenomenon is suppressed and starter motor power is reduced. While inlet guide vane (11) and variable stator vanes (C1 to C5) are set to predetermined opening from starting to rated speed, bleed valves (1, 2, 3) are set to predetermined opening until 52% speed for the bleed valve (1) and until 51% speed each for the bleed valves (2, 3), then the bleed valves (1, 2, 3) are fully opened until the speed exceeds 90%, when they are fully closed for rated operation. In the prior art, starting operation is done with bleed valves being first fully opened until the speed is elevated to 90% and then fully closed, but in the present invention, air discharged into ambient air in vain can be reduced and thereby starter motor power can be also reduced.

18 Claims, 4 Drawing Sheets

GAS TURBINE STARTING METHOD

BACKGROUND OF THE INVENTION

1. Field of the Invention

The present invention relates to a gas turbine starting method, which includes to reduce an air amount to be discharged into the air and to avoid a fluid unstableness phenomenon occurring in a compressor both at the time of starting.

2. Description of the Prior Art

FIG. 3 is a cross sectional view of one example of a gas turbine compressor in the prior art. In FIG. 3, numeral 50 designates a compressor and numeral 10 designates a rotor. The rotor 10 has rotor vanes M1, M2, M3, M4, . . . (illustration shows an example of 10 stages) fitted to an outer circumferential periphery of a rotor disc so as to be rotated together with the rotor 10. On the other hand, stator vanes C1, C2, C3, C4, . . . are fitted to an inner circumferential wall of a casing 14 so that the stator vanes and the rotor vanes are arranged alternately in an axial direction of the compressor 50.

At an inlet of the compressor 50, an IGV (Inlet Guide Vane) 11 is fitted to the inner circumferential wall of the casing 14 so as to adjustable of its opening by a driver portion 12.

Of the stator vanes shown in the example of FIG. 3, those of C1, C2, C3 and C4 are variable vanes and their openings are adjustable by respective driver portions 13-1, 13-2, 13-3 and 13-4. Air 20 is adjusted of a flow rate by the opening of the IGV 11 to enter the compressor 50 to be compressed while flowing through between the respective stator vanes and between the rotating rotor vanes and a compressed air 21 flows out of the compressor 50 to be supplied as a gas turbine combustion air or a turbine rotor or turbine blade cooling air. It is to be noted that while description is made with respect to FIG. 3 on the example of the compressor 50 having the vanes of 10 stages in total in which four stages of the stator vanes C1, C2, C3 and C4 are variable, such a compressor as having vanes of 15 stages in total in which five stages of stator vanes C1 to C5 are variable is also developed.

FIG. 4 is a diagrammatic constructional view of stator vanes and their surrounding portion of the above-mentioned compressor in the prior art having five stages of variable stator vanes C1 to C5. In FIG. 4, an IGV 11 is provided at an inlet of a compressor 50 and stator vanes C1 to C15 are arranged, although not all the stator vanes are illustrated. An opening 15 is provided immediately after the fifth stage stator vane C5 so as to communicate with a piping 30. The piping 30 is provided at its middle way with a bleed valve 60 for bleeding a compressed air. Likewise, an opening 16 is provided immediately after the eighth stage stator vane C8, and a piping 31 and a bleed valve 61 communicate therewith. Also, an opening 17 is provided immediately after the eleventh stage stator vane C11, and a piping 32 and a bleed valve 62 communicate therewith. It is to be noted that the openings 15, 16, 17, respectively, are provided at four places on an outer circumferential periphery of a casing and four pipings each of the pipings 30, 31, 32 join together to communicate with the respective bleed valves 60, 61, 62.

In the gas turbine compressor constructed as above, while the IGV 11 and the five stages of the stator vanes C1 to C5 are adjustable of their openings, the bleed valves 60, 61, 62 are so constructed as to be either fully opened or fully closed by an ON/OFF operation. At the time of starting, the IGV 11 and the stator vanes C1 to C5 are set to a predetermined opening, the bleed valves 60, 61, 62 are fully opened and air 20 is compressed. Until a rise of the gas turbine, the compressor is operated by a drive of a starter motor. At an initial slow speed operation and until the speed is elevated to about 90%, the bleed valves 60, 61, 62 are fully opened so that the air 20 is bled to be discharged into the ambient air for a matching of an air flow rate to the slow speed operation. When the speed comes to 90% of a rated speed and the operation rises up, the bleed valves 60, 61, 62 are fully closed and a steady operation starts. In such circumferences, there are problems in the prior art that a mismatching of the air flow rate occurs at the initial stage of the starting or a flow rate unstableness phenomenon occurs at the time when the bleed valves are closed while the speed is being elevated, etc. as well as the starter motor must have a large capacity in order to ensure a starting force at the time of operation start.

In the prior art gas turbine compressor, as mentioned above, when the operation is started, the starter motor is driven and the bleed valves are fully opened so that air is bled on the way for a matching to the operation state and when the speed is elevated to about 90%, the bleed valves are fully closed and the steady operation starts. In the mentioned operation method, while the speed is being elevated from the starting, a large amount of the air compressed halfway is discharged in vain into the ambient air.

Further, the starter motor is needed to have a sufficient capacity taking account of the air flow rate to be discharged into the ambient air at the time of starting. Also, the adjustment of the bleed valves to meet the air flow rate of the initial slow speed operation time and that of the compressor rated operation time is only done by the ON/OFF operation by which the bleed valves are either fully opened or fully closed, hence a phenomenon to cause an unstable fluid flow occurs at the starting time, which results in the obstruction in achieving a smooth speed elevation.

SUMMARY OF THE INVENTION

It is therefore an object of the present invention to provide a gas turbine starting method in which bleed valves of a compressor are improved of their opening and closing operation so as to be adjustable of openings continuously and the starting operation is done such that a plurality of the bleed valves are first throttled and changed of their respective openings and when the speed comes to a predetermined level, the bleed valves are fully closed so that a rated speed is attained, thereby a bleed air amount which has so far been discharged in vain into the ambient air is reduced, a fluid unstableness phenomenon at the starting time is avoided and a smooth speed elevation is attained.

In order to achieve said object, the present invention provides methods of the following (1) to (7).

(1) A gas turbine starting method comprising a step of setting an inlet guide vane (IGV) and a variable stator vane of a gas turbine compressor to a predetermined opening during a starting time from a start initiation to a rated speed, characterized in that a plurality of bleed valves of said compressor are made variable of their openings and are controlled to a predetermined opening during said starting time.

(2) A gas turbine starting method as mentioned in (1) above, characterized in that an opening setting of said plurality of bleed valves is such that said plurality of bleed valves are throttled to a predetermined opening for a time from the start initiation to a half way of a speed elevation, are fully opened at said half way of the speed elevation and are fully closed immediately before the rated speed.

(3) A gas turbine starting method as mentioned in (2) above, characterized in that said opening setting of the plurality of bleed valves for the time from the start initiation to the half way of the speed elevation is such that said plurality of bleed valves are set to openings which are different from each other.

(4) A gas turbine starting method as mentioned in (3) above, characterized in that said opening setting of the plurality of bleed valves for the time from the start initiation to the half way of the speed elevation is such that at least one of said plurality of bleed valves is fully closed.

(5) A gas turbine starting method as mentioned in any one of (2) to (4) above, characterized in that a speed when said plurality of bleed valves are fully opened is that which exceeds about 50% of the rated speed and at least one of said plurality of bleed valves is different in said speed from others of said plurality of bleed valves.

(6) A gas turbine starting method as mentioned in any one of (2) to (5) above, characterized in that a speed when said plurality of bleed valves are fully closed is that which exceeds about 90% of the rated speed.

(7) A gas turbine starting method as mentioned in any one of (1) to (6) above, characterized in that said plurality of bleed valves are arranged such that each one of them is connected to a portion immediately after a fifth stage stator vane, an eighth stage stator vane and an eleventh stage stator vane, respectively, of said compressor.

The present invention is based on the invention (1) above. For the time of the gas turbine starting until the gas turbine rises up, the compressor is driven by a starter motor. In the compressor, the IGV and the variable stator vane are set to a predetermined opening, the plurality of bleed valves are controlled to be opened or closed, so that air flow rate at the slow speed rotating time is adjusted and the speed is elevated. In the case of the gas turbine starting in the prior art, the starting operation is such that the bleed valves, which are of the type to be either opened or closed by the ON/OFF control, are fully opened until the speed comes to 90% of the rated speed and thereafter are fully closed, hence a large amount of the air is discharged into the ambient air to be wasted, which results in requiring a larger capacity of the starter motor. But in the present invention, the bleed valves are of the variable type in which the opening may be varied from a fully opened position to a fully closed position during the starting time, hence the flow rate of the air to be discharged into the ambient air from the bleed valves during the starting time can be controlled, so that the air discharged in vain can be reduced and also the control of the bleed valve opening can be done so as to avoid an occurrence of the fluid unstableness phenomenon during the time of the starting.

In the invention (2) above, the bleed valve opening is controlled finely corresponding to the speed elevation such that the bleed valves are first throttled to a predetermined opening until the half way of the speed elevation and then are fully opened until immediately before the speed comes to the rated speed and thereafter are fully closed for the rated operation. Hence, as compared with the prior art simple operation wherein the bleed valves are fully opened and then fully closed, the air discharged into the ambient air in vain can be reduced and by the bleed valve opening being controlled finely, the fluid unstableness phenomenon can be also controlled so as to be suppressed. As the bleed air flow rate which is necessary for suppressing the fluid unstableness phenomenon is different for each speed level, the bleed valve opening is controlled finely corresponding to each range of the speed level, thereby an optimum bleed air flow rate can be obtained.

In the invention (3) above, the plurality of bleed valves are throttled differently from each other in the openings, for example, in a larger opening for the front stage bleed valves and in a smaller opening for the rear stage bleed valves, and in the invention (4) above, at least one of the plurality of bleed valves, for example, the rearmost bleed valve, is fully closed. Thus, by such opening setting, the air discharged in vain can be reduced as well as by the fine control of the opening setting, an occurrence of the fluid unstableness phenomenon can be suppressed. Generally, when the air compressed at the compressor is to be abandoned outside, as the air of the rear stages has a higher energy, it will be a larger loss if the air of the rear stages is abandoned. Thus, in order to make use of the energy effectively, it is advantageous to bleed more the air in the front stages while the air in the rear stages is less bled. For this reason, as an extreme case, as mentioned in the invention (4) above, one of the bleed valves, for example of the rear stages, is fully closed and an energy loss is minimized, provided that by so doing, it is important not to cause the fluid unstableness phenomenon.

In the invention (5) above, the time when the bleed valves are fully opened on the way is that when the speed exceeds about 50% of the rated speed wherein at least one of the bleed valves is different in this speed from others of the bleed valves so that variation in the air flow rate may differ from each other. Usually, in the gas turbine, the exhaust gas temperature becomes highest in the speed range around 50%, hence if the bleed air amount is reduced in this speed range, it will be advantageous for suppressing the temperature elevation. Also, the fluid unstableness phenomenon of the compressor comes to its peak in the speed range around 60%, hence in order to increase the bleed air amount in this speed range, the opening of the bleed valves is operated on the boundary of about 50% speed. It is to be noted, however, that whether all the bleed valves are to be controlled at the same speed or at the different speeds may not be specified necessarily but may be set to various speeds.

In the invention (6) above, the time when the bleed valves are fully closed is set to the time when the speed exceeds 90% of the rated speed, hence the speed elevation from the start to the rated speed when the operation rises up can be done smoothly, excitation force acting on the vanes is suppressed and occurrence of the fluid unstableness phenomenon also is suppressed.

Further, in the invention (7) above, the bleed valves are arranged so as to bleed the air from the front stages to the rear stages of the compressor, thereby an appropriate setting of the air bleeding can be attained.

BRIEF DESCRIPTION OF THE DRAWINGS

FIG. 2 is a graph showing a starting operation state of the compressor of FIG. 1, wherein FIG. 2(a) shows an opening setting of vanes relative to speeds and FIG. 2(b) shows an opening setting of bleed valves relative to speeds.

DESCRIPTION OF THE PREFERRED EMBODIMENT

Figure 1:
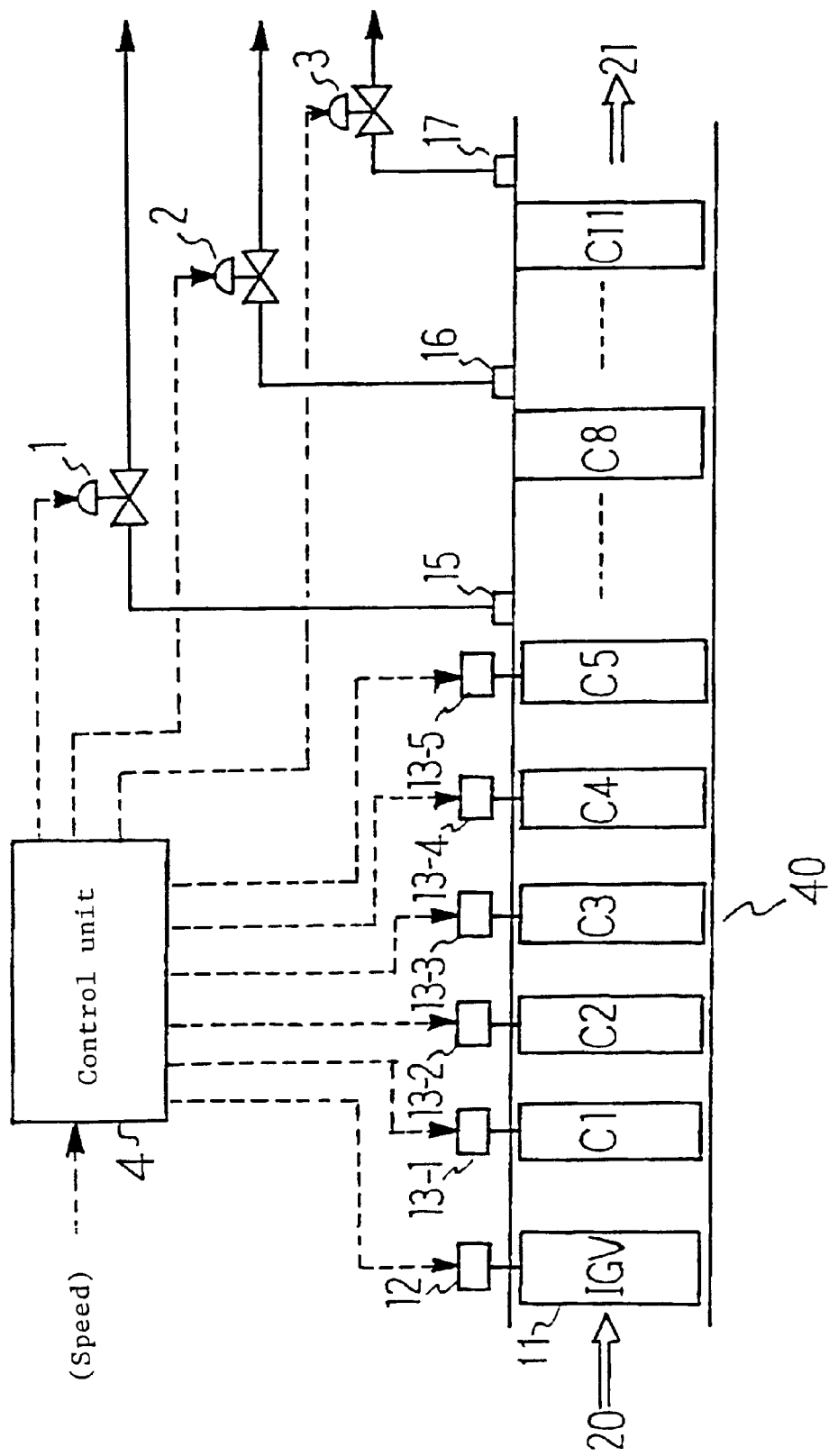
FIG. 1 is a diagrammatic constructional view of a compressor as an embodiment for carrying out a gas turbine starting method of the present invention.
Figure 4:
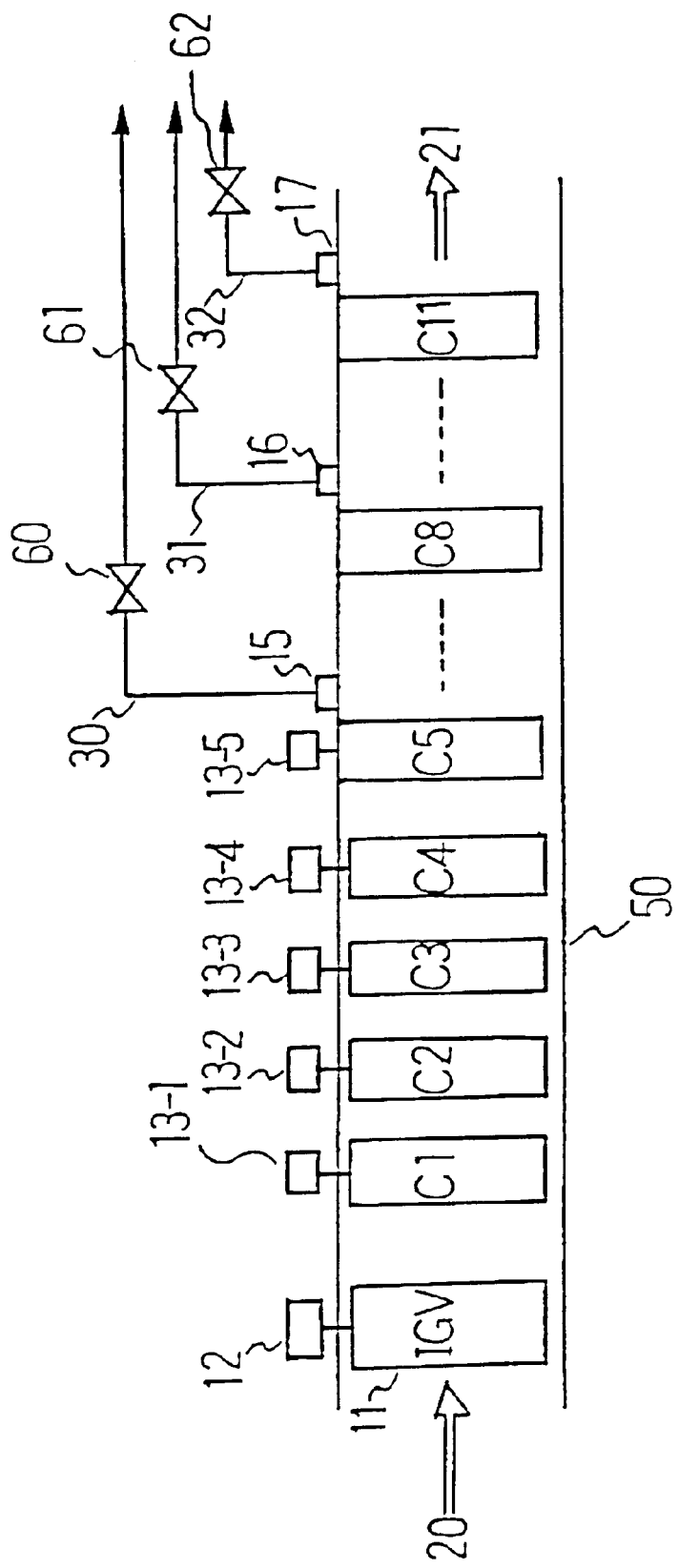
FIG. 4 is a diagrammatic constructional view of the compressor of FIG. 3.

Herebelow, an embodiment according to the present invention will be described concretely with reference to the figures. FIG. 1 is a diagrammatic constructional view of a compressor as an embodiment for carrying out a gas turbine starting method of the present invention. In FIG. 1, construction of the compressor is same as that of the prior art one shown in FIG. 4 and same parts are given with same reference numerals, and a featured portion of the present invention, that is, bleed valves 1, 2, 3 and a control method by a control unit 4, will be described in detail.

In FIG. 1, the bleed valves 1, 2, 3 are valves whose openings can be set arbitrarily, in place of the ON/OFF valves in the prior art which are either opened or closed only. In the present embodiment, when a gas turbine is to be started, it is so set at the control unit 4 that the bleed valves 1, 2, 3 of a compressor 40 are throttled to a predetermined opening from a fully opened position, wherein the respective openings of the three bleed valves 1, 2, 3 are different from each other, as exemplified later, and in this state, the operation is started. Then, when the speed is elevated halfway, the respective bleed valves 1, 2, 3 are fully opened at the same or slightly different speeds. In this state, the operation is continued, and after the speed exceeds 90% of a rated speed, the respective bleed valves 1, 2, 3 are fully closed and then the operation comes to a rated operation with the speed of 100%.

Figure 2:
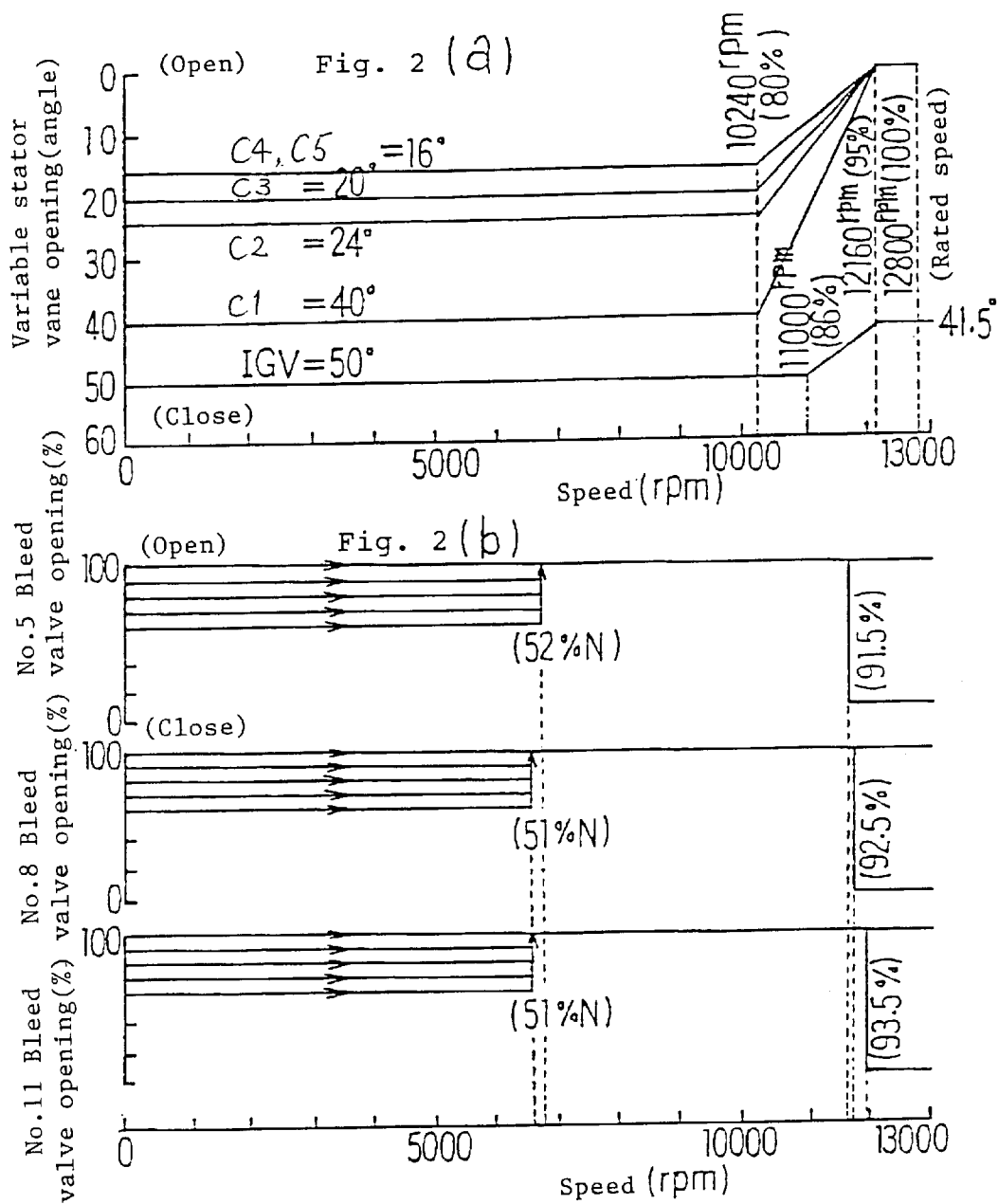
Figure 3:
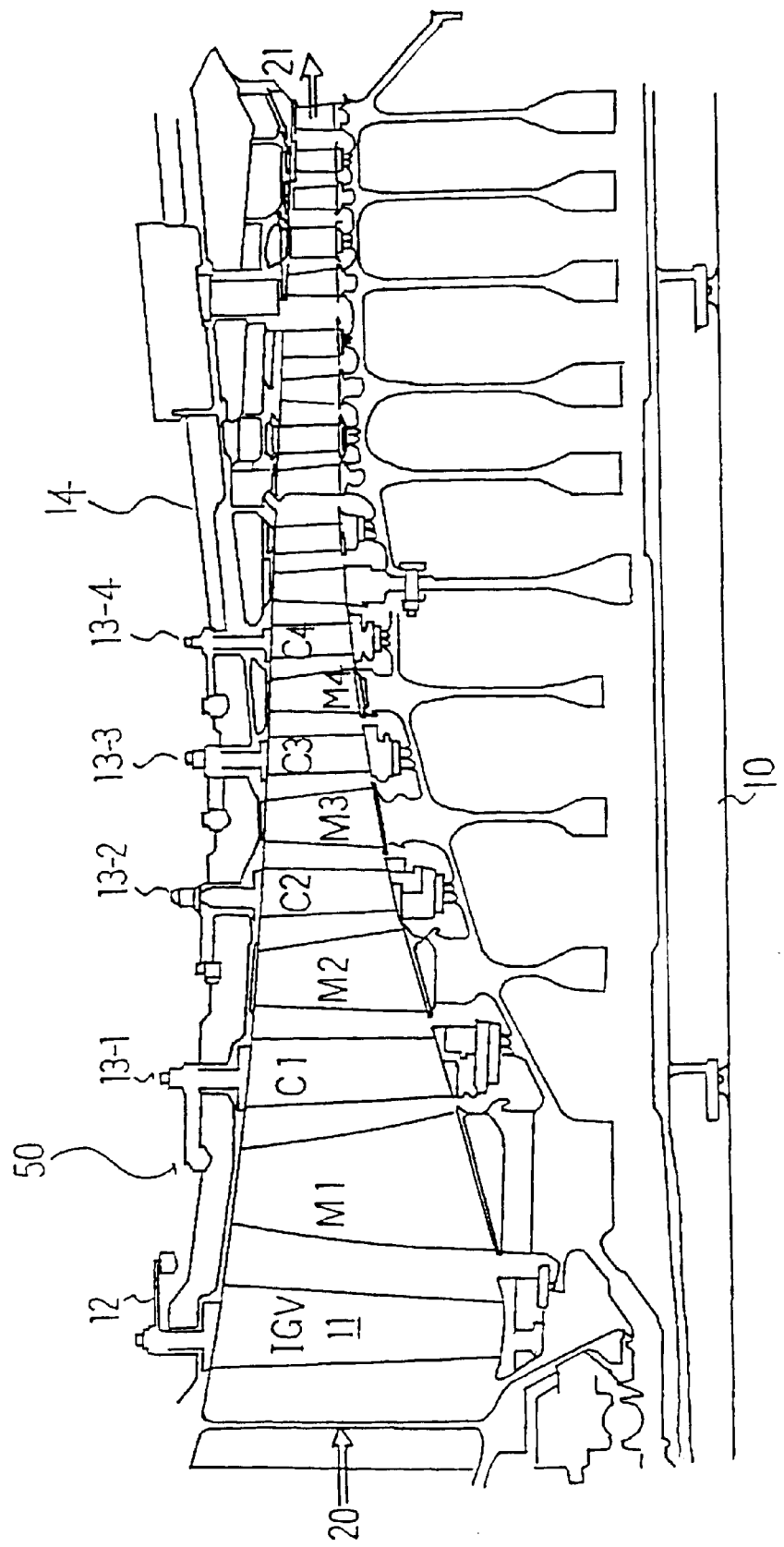
FIG. 3 is a cross sectional view of a gas turbine compressor in the prior art.

FIG. 2 is a graph showing an operation state of the compressor of the embodiment of FIG. 1, wherein FIG. 2(a) shows an opening setting state of the IGV 11 and the five variable stator vanes C1, C2, C3, C4, C5 relative to the speed elevation and FIG. 2(b) shows an opening setting state of No. 5, No. 8, No. 11 bleed valves 1, 2, 3 relative to the speed elevation. It is to be noted that No. 5, No. 8 and No. 11 bleed valves correspond to the bleed valves 1, 2 and 3, respectively.

In FIG. 2(a), for the time of starting until the speed comes to 80% of the rated speed, the opening setting (angle) of the IGV 11 and the variable stator vanes C1 to C5 is so made that 50° for the IGV, 40° for C1, 24° for C2, 20° for C3 and 16° each for C4 and C5. Then, during the time of the speed from 80% to 95%, the respective stator vanes C1 to C5 are further opened gradually in proportion to the speed elevation so as to be fully opened at the speed of 95%, while the IGV 11 is maintained to the opening of 50° until the speed of 86% and is then further opened gradually so as to be set to 41.5° at the speed of 95%, which is maintained thereafter. Thus, a steady operation in the rated speed is done with the stator vanes C1 to C5 being fully opened and the IGV 11 being set to an intermediate opening of 41.50°. The mentioned opening control of each of the vanes is set at the control unit 4, by which the control is done to give the set values automatically at the respective speeds.

On the other hand, as shown in FIG. 2(b), each of No. 5, No. 8, No. 11 bleed valves 1, 2, 3 is set to any one, selected differently from each other, of opening set values, wherein said opening set values are five values, as illustrated for example, selected between 100% (fully opened) and 0% (fully closed) for each of the bleed valves, and in this state, the operation is started. Then, the bleed valves 1, 2, 3 are fully opened on a half way of the speed elevation, that is, in the example of FIG. 2(b), No. 5 bleed valve 1 is fully opened when the speed is elevated to 52% and No. 8 and No. 11 bleed valves 2, 3 are fully opened both at the speed of 51%, and the speed continues to be elevated.

Then, No. 5 bleed valve 1 is fully closed at the speed of 91.5%, No. 8 bleed valve 2 is fully closed at the speed of 92.5% and No. 11 bleed valve 3 is fully closed at the speed of 93.5%. Thereafter, with the bleed valves 1, 2, 3 being so closed, a rated speed is attained and a steady operation starts. The mentioned opening control of each of the bleed valves is set at the control unit 4 in the form of a valve opening pattern relative to the respective speed, by which the control is done automatically.

According to the gas turbine starting method of the above-mentioned embodiment, the compressor 40 is so controlled by the control unit 4 that the IGV 11 is set to a predetermined opening which is slightly changed on the way, the variable stator vanes C1 to C5 are set to a predetermined opening until the speed of 80% and are then further opened gradually in proportion to the speed elevation from 80% to 95% to be fully opened at the speed of 95%. At the same time, the compressor 40 is also controlled to be started by the control unit 4 such that No. 5 bleed valve 1, No. 8 bleed valve 2, No. 11 bleed valve 3 are throttled to a predetermined opening until the half way of the speed elevation and are then fully opened until the speed exceeds 90%, when they are fully closed. Thus, as compared with the prior art gas turbine starting method where the bleed valves of the compressor are fully opened and the air is discharged in vain into the ambient air, in the present invention, a portion of the air which is otherwise so discharged can be used effectively for the gas turbine as a compressor discharge air.

In the mentioned method of the operation, an actual test has been done wherein No. 5 bleed valve 1, No. 8 bleed valve 2 and No. 11 bleed valve 3 are first set to the opening of 8%, 48% and 0% (fully closed), respectively, and are then fully opened at the speed of 52%, 51% and 51%, respectively, and are fully closed when the speed exceeds 90%, which resulted in confirming that while the air discharged from the bleed valves is 48% in the prior art method, it is only 25% in the method of the present invention and it has been found that the air is used effectively in the present invention.

That is, as the bleed valve openings, the three bleed valves 1, 2, 3 are set to the openings which are different from each other, for example, to a larger opening for the front or middle stage bleed valves and a smaller or zero opening for the rear stage bleed valves, thereby the air discharged in vain can be reduced and also an occurrence of the fluid unstableness phenomenon can be suppressed by such controlled operation.

Further, the compressor is operated to be started with the bleed valves being throttled and then being fully opened on the way of the speed elevation, hence the power of the starter motor at the time of the starting can be a smaller one as compared with the prior art case. Also, the bleed valves 1, 2, 3 are so controlled as mentioned above by the control unit 4, thereby an occurrence of the fluid unstableness phenomenon can be suppressed as compared with the prior art case where the bleed valves are either fully opened or fully closed only.

What is claimed is:

1. A gas turbine starting method comprising a step of setting an inlet guide vane and a variable stator vane of a gas turbine compressor to a predetermined opening during a starting time from a start initiation to a rated speed, wherein a plurality of bleed valves of said compressor are made variable of their openings and are controlled to a predetermined opening during said starting time.

2. A gas turbine starting method as claimed in claim 1, wherein an opening setting of said plurality of bleed valves is such that said plurality of bleed valves are throttled to a predetermined opening for a time from the start initiation to a half way of a speed elevation, are fully opened at said half way of the speed elevation and are fully closed immediately before the rated speed.

3. A gas turbine starting method as claimed in claim 2, wherein said opening setting of the plurality of bleed valves for the time from the start initiation to the half way of the speed elevation is such that said plurality of bleed valves are set to openings which are different from each other.

4. A gas turbine starting method as claimed in claim 3, wherein said opening setting of the plurality of bleed valves for the time from the start initiation to the half way of the speed elevation is such that at least one of said plurality of bleed valves is fully closed.

5. A gas turbine starting method as claimed in claim 2, wherein a speed when said plurality of bleed valves are fully opened is that which exceeds about 50% of the rated speed and at least one of said plurality of bleed valves is different in said speed from others of said plurality of bleed valves.

6. A gas turbine starting method as claimed in claim 2, wherein a speed when said plurality of bleed valves are fully closed is that which exceeds about 90% of the rated speed.

7. A gas turbine starting method as claimed in claim 5, wherein a speed when said plurality of bleed valves are fully closed is that which exceeds about 90% of the rated speed.

8. A gas turbine starting method as claimed in claim 1, wherein said plurality of bleed valves are arranged such that each one of them is connected to a portion immediately after a fifth stage stator vane, an eighth stage stator vane and an eleventh stage stator vane, respectively, of said compressor.

9. A gas turbine starting method as claimed in claim 5, wherein said plurality of bleed valves are arranged such that each one of them is connected to a portion immediately after a fifth stage stator vane, an eighth stage stator vane and an eleventh stage stator vane, respectively, of said compressor.

10. A gas turbine starting method as claimed in claim 6, wherein said plurality of bleed valves are arranged such that each one of them is connected to a portion immediately after a fifth stage stator vane, an eighth stage stator vane and an eleventh stage stator vane, respectively, of said compressor.

11. A gas turbine starting method as claimed in claim 3, wherein a speed when said plurality of bleed valves are fully opened is that which exceeds about 50% of the rated speed and at least one of said plurality of bleed valves is different in said speed from others of said plurality of bleed valves.

12. A gas turbine starting method as claimed in claim 4, wherein a speed when said plurality of bleed valves are fully opened is that which exceeds about 50% of the rated speed and at least one of said plurality of bleed valves is different in said speed from others of said plurality of bleed valves.

13. A gas turbine starting method as claimed in claim 3, wherein a speed when said plurality of bleed valves are fully closed is that which exceeds about 90% of the rated speed.

14. A gas turbine starting method as claimed in claim 4, wherein a speed when said plurality of bleed valves are fully closed is that which exceeds about 90% of the rated speed.

15. A gas turbine starting method as claimed in claim 2, wherein said plurality of bleed valves are arranged such that each one of them is connected to a portion immediately after a fifth stage stator vane, and eighth stage stator vane and an eleventh stage stator vane, respectively, of said compressor.

16. A gas turbine starting method as claimed in claim 3, wherein said plurality of bleed valves are arranged such that each one of them is connected to a portion immediately after a fifth stage stator vane, and eighth stage stator vane and an eleventh stage stator vane, respectively, of said compressor.

17. A gas turbine starting method as claimed in claim 4, wherein said plurality of bleed valves are arranged such that each one of them is connected to a portion immediately after a fifth stage stator vane, and eighth stage stator vane and an eleventh stage stator vane, respectively, of said compressor.

18. A gas turbine starting method as claimed in claim 7, wherein said plurality of bleed valves are arranged such that each one of them is connected to a portion immediately after a fifth stage stator vane, and eighth stage stator vane and an eleventh stage stator vane, respectively, of said compressor.

\* \* \* \* \*